United States Patent
Buhl et al.

(10) Patent No.: US 6,348,538 B1
(45) Date of Patent: *Feb. 19, 2002

(54) METHOD FOR THE PREPARATION OF PIGMENTED CURABLE POLYESTER MOLDING COMPOUNDS

(75) Inventors: Dieter Buhl, Frankenthal; Heinz Fuerst, Eisenberg; Harald Schneider, Urmitz, all of (DE)

(73) Assignee: DSM N.V., Heerlen (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/250,176

(22) Filed: Feb. 16, 1999

(51) Int. Cl.⁷ ............................................. C08L 67/00
(52) U.S. Cl. .................................. 524/513; 525/329.5
(58) Field of Search ........................ 524/513; 525/329.5

(56) References Cited

U.S. PATENT DOCUMENTS

| | | | |
|---|---|---|---|
| 4,009,225 A | 2/1977 | Maxel | 260/862 |
| 5,094,797 A | 3/1992 | Heel | 264/349 |

FOREIGN PATENT DOCUMENTS

| | | |
|---|---|---|
| EP | 272127 A | 6/1988 |
| JP | 61166850 | 7/1986 |
| JP | 62204908 | 9/1987 |

*Primary Examiner*—Peter D. Mulcahy
(74) *Attorney, Agent, or Firm*—Pillsbury Winthrop LLP

(57) ABSTRACT

The invention relates to a process for preparing a pigmented curable molding compound comprising mixing together an unsaturated polyester resin, a thermoplastic polymer, a color paste and optionally a filler, and is characterized in that the color paste is obtained by dissolving pigment particles in a solution of a thermoplastic polymer in a suitable solvent. The invention further relates to the color paste itself and to homogeneously and uniformly colored moldings obtained thereform.

5 Claims, No Drawings

METHOD FOR THE PREPARATION OF PIGMENTED CURABLE POLYESTER MOLDING COMPOUNDS

The invention relates to a method for the preparation of pigmented curable polyester molding compounds which contain an unsaturated polyester, copolymerizable monomers, a thermoplastic polymer and a color pigment.

Curable unsaturated polyester compounds such as SMC (sheet molding compound) and BMC (bulk molding compound) frequently are to be cured to form homogeneously pigmented moldings. To this end, pigments are added to the compound either in pure form or in the form of a premixture (hereinafter called 'color paste'). Known color pastes comprise pigment particles dispersed in a suitable carrier resin. Suitable carrier resins are for instance unsaturated polyesters of low viscosity, such as described in U.S. Pat. No. 4,009,225 for instance, or a polystyrene carrier resin, functionalized with oxazoline groups, such as described in EP-A-272 127. Color pastes are used since it is extremely difficult under the usual conditions to disperse pigment particles directly in a uniform and homogeneous manner into other substances, such as for instance thermoplastic and/or thermosetting resins.

Although with the method as described in U.S. Pat. No. 4,009,225 reasonably homogeneous pigmented moldings can be obtained there is a need to further improve the uniformity of the perceived color of the molding surface. Moreover the intensity of the color and the range of possible color shades must be improved in an economically feasible way.

The aim of the present invention therefore is to provide a simple and inexpensive process for preparing homogeneously and uniformly pigmented curable molding compounds with a high color intensity and a wide range of color shades.

This objective is achieved by a process for preparing a pigmented curable molding compound comprising mixing together A. an unsaturated polyester resin, and
B. a thermoplastic polymer, in a weight ratio A:B of 0.4 to 10, the total of A and B being 100 parts by weight (pbw),
C. 3–40 pbw of a color paste,
D. 0–450 pbw of a filler,
E. 0.2–4 pbw of a radical initiator, as well as
F. optionally further customary additives, characterized in that, the color paste C is obtained by preparing a solution of a thermoplastic polymer G in a suitable solvent H, and dissolving pigment particles in said solution.

By preparing the color paste according to the invention the dispersion of pigment particles in a molding compound containing the color paste is unexpectedly improved, and therefore also the uniformity of the perceived color.

An additional advantage of the method of the invention is that pigmented curable molding compounds of low-shrinkage (LS) and/or low-profile (LP) type can be obtained with unprecedented color homogeneity and uniformity. It is well known in the art (see for instance "Sheet Molding Compounds-Science and Technology", Ed. Hamid G. Kia, Hanser Publ., page 69) that it is extremely difficult to provide homogeneous pigmentation for these LS and LP molding compounds, particularly in darker colors. The method according to the invention solves this problem, thereby providing molding compounds, which, when molded, produce moldings with a very smooth surface (Class A) and uniform color simultaneously.

The following remarks concern the individual components of the moulding compound according to the invention:

A. Unsaturated polyester (UP) resins are solutions of unsaturated polyesters in copolymerizable monomers, preferably in styrene. Suitable unsaturated polyesters are the usual condensation products of polybasic, in particular dibasic carboxylic acids and their esterifiable derivatives, in particular their anhydrides, which are bonded in the way of an ester with polyhydric, in particular dihydric alcohols, and which may additionally contain residues of monobasic carboxylic acids or monohydric alcohols, with at least part of the starting materials being provided with ethylenically unsaturated, copolymerizable groups. Preferred unsaturated polyesters are those on the basis of maleic anhydride and orthophthalic acid or isophthalic acid, on the one hand, and propylene glycol, ethylene glycol, diethylene glycol and/or dipropylene glycol on the other. If minor amounts of dicyclopentadiene have been incorporated in the UP resin during the condensation process, the viscosity of the resin will be lower.

B. The moulding compound contains, relative to 100 pbw of UP resin, 10 to 250 pbw, preferably 10 to 100 pbw, more preferably 20 to 80 pbw of a thermoplastic polymer. The thermoplastic polymer is added to control the polymerization shrinkage of the UP resin. Dependent on the particular shrinkage control achieved one speaks of LS-systems (linear shrinkage more than 0.05%) and of LP-systems (linear shrinkage equal to or less than 0.05%). The thermoplastic polymer B can be any thermoplastic known to be able to control the UP resin polymerization shrinkage. Suitable thermoplastics are for instance vinylaromatic polymers, such as polystyrene, polyolefinic polymers, such as polyethylene, acrylic-based polymers, such as polymethylmethacrylate, polyvinyl acetate polymers, saturated polyesters, and/or dual-thickening systems containing isocyanate prepolymers, and combinations thereof. Preferred are saturated polyesters based on adipic acid (optionally replaced up to 30 wt. % by other saturated dicarboxylic acids) on the one hand, and ethylene glycol, propylene glycol, diethylene glycol and/or dipropylene glycol (optionally replaced up to 30 wt. % by other diols) on the other. The molecular weight $M_n$ of the saturated polyesters is preferably between 1000 and 10,000. Up to 50%, preferably 5 to 40%, of the weight of the saturated polyester may be replaced by other thermoplastics, such as polymethylmethacrylate, polyvinylacetate and/or polystyrene. It is useful to apply component B in the form of a solution in a monomer that copolymerizes with A, e.g. styrene; it has proved to be advantageous if the viscosity of the solution at 23° C. is lower than 3000 mPa.s, preferably lower than 500 mPa.s.

C. The moulding compound comprises 3 to 40, preferably 5 to 25 pbw of color paste relative to 100 pbw of the total of UP resin and thermoplastic polymer (components A and B). The color paste according to the invention is prepared by dissolving pigment particles in a solution of a thermoplastic polymer G in a suitable solvent H. The color pigment used can be any commercially available organic and/or inorganic pigment, or a mixture of several of them. Suitable organic pigments are e.g. Phthalocyanine Blue, Perylene Red, Pyrazolone Yellow, Chromium-azo complex Red, Isoindolinone Yellow and/or Anthraquinone Red. Suitable inorganic pigments are e.g. Titanium Dioxide, Zinc Sulphide Iron (III) Oxide, Pink Red, Chromium (III) Oxide, Cobalt Blue and/or Ultramarine, as well as lead chromates, molybdates and Carbon Black. Preferred are those pigments that are not destroyed or damaged under the conditions of free radical polymerization and the usual molding conditions for thermosetting molding compounds, such as elevated temperature and pressure. Pigments being moreover resistant to the used solvent H in the color paste are particularly preferred.

D. Suitable fillers are for example customary finely pulverulent or granular inorganic fillers, such as chalk, calcium carbonate, kaolin, quartz powder, dolomite, baryte, metal powders, hydrated alumina, cement, talc, diatomaceous earth, sawdust, wood chips and the like. They are preferably present in the molding compound in amounts of 30 to 450 pbw, based on the total weight of UP resin and thermoplastic polymer (components A and B). In order to ensure flameproof properties, the resin paste preferably comprises aluminium oxide trihydrate, $Al_2O_3.3H_2O$, as a filler.

E. The molding compound comprises 0.2 to 4, preferably 0.5 to 3 pbw of a radical initiator, preferably an organic peroxide, which decomposes into radicals, preferably in the range from 60 to 120° C., and is capable of initiating the polymerization of the UP resin.

E. Suitable further customary additives are well known to the person skilled in the art of preparing molding compounds. Suitable examples are e.g. reinforcing fibers, inhibitors and thickening agents. Suitable reinforcing fibers are inorganic and organic fibers in the form of rovings or in the form of sheetlike structures, possibly woven therefrom, such as mats, made for example of glass, carbon, asbestos, cellulose and synthetic organic fibers such as polyethylene, polycarboxylic esters, polycarbonates and polyamides. They are preferably present in the molding compound in amounts of 10 to 65% by weight, based on the total weight of the molding compound. Suitable inhibitors are phenolic compounds, such as (substituted) hydroquinone, pyrocatechol, tertbutylpyrocatechol, ring-substituted pyrocatechols, quinones, such as benzoquinone, naphtoquinone, chloranil, nitrobenzenes, such as m-dinitrobenzene, thiodiphenylamine, N-nitroso compounds, such as N-nitrosodiphenylamine, and salts of N-nitroso-N-cyclohexylhydroxylamine, and also mixtures thereof. Suitable additional stabilizers include salts of divalent copper, for example cupric naphtenate or octoate, and quaternary ammonium salts. The inhibitors are preferably present in the molding compound in amounts of 0.005 to 0.5% by weight, based on the total weight of components A and B. The thickening agents used are oxides or hydroxides of lithium, magnesium, calcium, aluminium or titanium. Preference is given to magnesium oxide and/or magnesium hydroxide. The thickening agents are preferably present in the molding compound in amounts of 0.2 to 5% by weight, based on the total weight of components A and B. Other possible customary additives are lubricants, such as zinc stearate, magnesium stearate, calcium stearate and also polyalkylene ether waxes, paraffins, curing accelerants, for example octoates or naphtenates of copper, lead, calcium, magnesium, cerium and in particular of manganese and cobalt, and aromatic amines, such as dimethylaniline and diethylaniline, and thickening accelerants, for example ammonium chlorides, phosphonium chlorides, sulfonium halides, water, polyols and 1,2-propanediol.

G. Suitable thermoplastics to be used in the method for preparing the color paste according to the invention are all thermoplastic polymers mentioned above as suitable thermoplastic polymers B. Preferably thermoplastic polymer G has similar properties as component B. More preferably thermoplastic polymer G is the same polymer as component B. Preferred polymers G are therefore thermoplastic saturated polyesters. More preferred are saturated polyesters based on adipic acid (optionally replaced up to 30 wt. % by other saturated dicarboxylic acids) on the one hand, and ethylene glycol, propylene glycol, diethylene glycol and/or dipropylene glycol (optionally replaced up to 30 wt. % by other diols) on the other. The molecular weight $M_n$ of the saturated polyesters is preferably between 1000 and 10,000. Up to 50%, preferably 5 to 40%, of the weight of the saturated polyester is preferably replaced by other thermoplasts, such as polymethylmethacrylate, polyvinylacetate or polystyrene.

H. Suitable solvents H are all solvents in which the thermoplastic polymer G is readily soluble. Preferably solvent H is a monomer that copolymerizes readily with component A, e.g. styrene. It has proved to be advantageous if the viscosity of the solution of thermoplast G in solvent H at 23° C. is lower than 2000 mPa.s, preferably lower than 500 mPa.s.

The color paste according to the invention is prepared by first forming a solution of 10–60 wt-%, preferably 25–45 wt.-%, of thermoplastic polymer G in 90–40 wt.-%, preferably 75–55 wt.-% of solvent H. The wt.-% are based on the total weight of G and H. Thereafter 20–80 pbw pigment particles are dissolved in 80–20 pbw of the formed solution by usual mixing. Preferably 0.5–5 pbw of a wetting agent and 1–10 pbw of a viscosity depressant are added as well. Further customary additives may be added such as those described above as component F (inhibitors, stabilisers and so on). Suitable wetting agents are the customary wetting agents used in the art, such as e.g. the high molecular weight block copolymers sold by Byk (Byk W972 or similar products). They are added to improve fibre wetting and/or depress demixing and agglomeration of pigment particles. Suitable viscosity depressants are the customary viscosity depressants used in the art. Preferred are those based on saturated polyesters with acidic groups and/or their solutions, or those based on stearic and/or palmitic acid.

A typical manufacturing process for the color paste according to the invention and using a dissolver is given below although by no means meant to be limiting. The thermoplastic polymer solution (components G and H) is poured into a mixing vessel which has preferably a diameter 1.5–2.5 times the size of the disc of the dissolver to be used. Subsequently, all other liquid components (viscosity depressants, inhibitors, stabilisers, etc.) are added to the mixing vessel while stirring slowly. Pigment particles are then added to the mixing vessel using a dissolver working preferably at 400–600 rpm. Subsequently the pigment particles are predispersed for about 30–45 min at dissolver speeds of 400–1000 rpm preferably. Hereafter, the formed intermediate pigment paste is taken out and in a preferred method finely ground by means of a mill, a multichamber ball-mill being preferred. Such mills are obtainable for instance at the company Vollrath in Cologne, Germany. The grounding step is preferably carried out at a temperature below 70° C. The grounded paste particles are then preferably dispersed further during about 10 to 30 min. at dissolver speeds of 400–1000 rpm preferably, eventually adding small amounts of viscosity depressant in order to adjust and/or fine-tune the color paste viscosity and color.

The formed color paste preferably has a viscosity of 2000 to 20000 mPa.s and a density of 1.0 to 2.7 g/cm$^3$. The paste is pumpable, free-flowing and can easily be added to the other components of the molding compound by using a metering unit. Although the paste may contain pigment particles of any size preferred pigment particle sizes are lower than 20 $\mu$m, more preferably lower than 10 $\mu$m, most preferably lower than 3 $\mu$m.

The color paste according to the invention is easily mixed with the other components of the polyester resin in a conventional manner. The components are mixed in a conventional mixing apparatus, for example in a stirred vessel or blade mixer. The resin paste thus obtained is then used to impregnate glass fibers for instance.

The components of the molding compound are preferably present in such amounts that the compound has a viscosity at 23° C. of 10,000 to 120,000 mPa.s, preferably of 30,000 to 90,000 mPa.s. In this way the glass fibres can be wetted to a sufficient degree, while moldability of the compound is retained. The viscosity can easily be controlled by selecting the type and amount of UP resin A, the thermoplast B and the amount of solid matter added. Also, for the purpose of lowering the viscosity, styrene and/or viscosity reducing agents can be added. Articles made from a molding compound, comprising the pigment paste according to the invention, show a surprisingly homogeneous and uniform pigmentation. The pigmented articles preferably have a color deviation $\Delta E$ from the average color value below 0.3, more preferably below 0.15. The average color value is defined as the average of color spectrum measurements in several selected points on the surface of the molding. The color value in every point is obtained by a spectral photometric method according to DIN 6174CIE Lab, using standard light D 65 10°. The calculation of the color deviation $\Delta E$ was carried out as specified in the above mentioned DIN-norm.

The SMC's or BMC's are prepared with application of the known methods. In the case of SMC's, 0.5 to 5 pbw, relative to 100 pbw of UP resin A and thermoplastic polymer B, of a thickening agent, preferably magnesium oxide or magnesium hydroxide, are admixed with the resin paste, whereby the process of thickening is started. Next, the reinforcing fibres are added. Advantageously, this is done by sprinkling 3 to 55 mm long chopped glass fibres on a running conveyor belt carrying the thickening resin paste and working these into the mass with the aid of an impregnation device. In principle, it is also an option to impregnate a prefabricated glass fibre mat with the resin paste. The amount of glass fibres applied is preferably 10 to 65 wt. %, relative to the weight of the molding compound. After that, thickening is completed, which process can be accelerated by raising the temperature to between 30 and 60° C., or decelerated by cooling below room temperature.

In the preparation of BMCs, chopped fibres are wetted with the resin paste in kneading or agitating devices. Moulding compounds can also be obtained by pultrusion, involving the impregnation of continuous rovings with the resin paste according to the invention in impregnation baths.

The moulding compounds obtained according to the invention can be moulded by compression moulding, deep-drawing, injection moulding, pultrusion, resin transfer moulding and/or draw die moulding and cured by heating to temperatures of preferably 80 to 180° C.

A particularly preferred homogeneously colored moulding comprises

| | |
|---|---|
| 10 to 20 wt. % | of cured polyester resin, |
| 1 to 20 wt. % | of a thermoplastic polyester, optionally replaced up to 50% of its weight by another thermoplastic polymer, |
| 0.5 to 5 wt. % | of pigment particles, |
| 5 to 65 wt. % | of fillers, |
| 0.1 to 2 wt % | of magnesium oxide and/or magnesium hydroxide, |
| 10 to 65 wt. % | of glass fibres, | and has a maximum color deviation $\Delta E_{max}$ from the average color value (determined according to DIN 6174) below 0.3.

The mouldings according to the invention can be used for instance for storage purposes in the electronics sector, as electronic engineering components, as well as in the automotive and railway vehicle construction sectors. They are particularly useful in applications where a very smooth surface (Class A) must be obtained together with a homogeneous and uniform color.

The invention will now be illustrated further by the following examples, without being limiting in any way to the scope of the invention as claimed.

EXAMPLES I–II and COMPARATIVE EXPERIMENTS A–B

The compositions prepared in all Examples and Comparative Experiments contain the following components (in pbw):

| | |
|---|---|
| A | 50 pbw of a 64% solution in styrene of an unsaturated polyester of maleic acid, orthophthalic acid, propylene glycol, diethylene glycol and dipropylene glycol (Palatal P 172-01, from DSM-BASF Structural Resins); |
| B1 | 40 pbw of a 35% solution in styrene of a mixture of 30% of polyvinylacetate and 70% of a saturated polyester of adipic acid, ethylene glycol and propylene glycol in a molar ratio of 1:0.6:0.4; |
| B2 | 10 pbw of a 35% solution in styrene of polystyrene; |
| C | 14 pbw of a color paste; |
| D | 200 pbw of calcium carbonate (Millicarb ™ from Omya); |
| E | 1.5 pbw of tert.butylperbenzoate; |
| F1 | 4.5 pbw of zinc stearate; |
| F2 | 0.1 pbw of inhibitor (BC500 from Akzo); |
| F3 | 2.5 pbw of thickening paste (35% by weiqht of magnesium oxide in 65% by weight of unsaturated polyester); |
| F4 | 1 pbw of a viscosity reducer; |
| F5 | 3 pbw of styrene as viscosity reducer; |
| F6 | 25% by weight, relative to the total molding compound weight of 26 mm long glass fibre rovings; |

Examples I–II and Comparative Experiments A–B differ in the way of preparation of the color paste C.

Preparation of the Color Paste

Example I 30 pbw of a 35% solution in styrene (component H) of a mixture of 20% of polymethylmethacrylate and 80% of a saturated polyester is brought into a mixing vessel. To this solution are then added under continuous slow stirring the usual processing aids, such as a wetting agent (Byk W-972), a viscosity depressant (Byk 996) and styrene, and a minute amount of inhibitor (0.2 pbw). Thereafter commercial titanium-dioxide pigment particles (anatase type) are added to the mixing vessel using a dissolver with a disc size of half the mixing vessel diameter. The dissolver operates at about 500 rpm. Subsequently the pigment particles are further dispersed in the mixture for about 40 min. at 750 rpm dissolver speed.

The obtained pre-dispersion is then transferred to a multichamber ball-mill of the company Vollrath, Germany and further dispersed for about 30 min. at a temperature of about 50° C. Finally color and viscosity adjustments are carried out by adding small amounts of pigment paste and processing aids using the dissolver at 750 rpm. The obtained white color paste consisted of 30 pbw of the thermoplastic polymer solution, 2 pbw of wetting agent, 3 pbw of viscosity depressant, 1 pbw of styrene and 60 pbw of the titanium dioxide pigment.

Example II

In Example II a color paste was made in exactly the same manner as described above for Example 1. The grey color paste contained the following components: 30 pbw of a 35% solution in styrene (component H) of a mixture of 20% of polymethylmethacrylate and 80% of a saturated polyester, 2 pbw of wetting agent (Byk 972), 4 pbw of viscosity depressant (Byk 996), 2 pbw of styrene and a pigment mixture, consisting of 58 pbw of titanium dioxide pigment and 5 pbw of iron-oxide black.

Comparative Experiment A

In this comparative experiment the color paste is made by mixing pigment particles into state of the art carrier resins. An unsaturated polyester resin of low viscosity is used as carrier resin. 28 pbw of a monomer-free low-viscosity unsaturated polyester resin (Synolite™ 9286 of DBSR) is brought into a mixing vessel. To this solution are then added under continuous slow stirring the usual processing aids, such as a wetting agent (Byk W-972) and a viscosity depressant (Byk 996). Thereafter commercial titaniumdioxide pigment particles (anatase type) are added to the mixing vessel and dispersed in the same manner as described for Examples I and II. The obtained white color paste consisted of 28 pbw of the unsaturated polyester resin, 1 pbw of wetting agent, 1.5 pbw of viscosity depressant, and 70 pbw of the titanium dioxide pigment.

Comparative Experiment B

In Comparative Experiment B a color paste was made in exactly the same manner as described above for Comparative Experiment A. The grey color paste contained the following components: 28 pbw of the unsaturated polyester resin, 1 pbw of wetting agent, 2 pbw of viscosity depressant, and a pigment mixture of 62 pbw of the titanium dioxide pigment, and 5 pbw of iron-oxide black.

Preparation of the Molding Compounds

To 100 pbw of a mixture of components A, B1 and B2, were added in the usual manner at room temperature: 14 pbw of the obtained color pastes C, 200 pbw of calcium carbonate D, 2.5 pbw of a thickening paste F3, as well as the other additives E, F1, F2, F4, F5 in the quantities mentioned above, and 25% by weight, relative to the weight of the total molding compound, of 26 mm long glass fibre rovings (F6). After 5 days of thickening-maturation the compounds were cured by compressing them into rectangular plates for 3 minutes at 145° C. The mouldings obtained were subsequently subjected to colorimetric measurements, according to DIN 6174. Measurements of color values were carried out on 12 locations of the plates, regularly spaced over the surface of front and back side. From these readings the average color value of one plate surface was calculated and the $\Delta E$ color deviation from this average was then taken for every location. The maximum color deviation $\Delta E_{max}$ per plate surface was taken as a measure of color homogeneity and uniformity. In addition to this measurement, a visual assessment was carried out. Results were as follows.

| Experiment | Color deviation $\Delta E_{max}$ | Visual assessment |
|---|---|---|
| I (white) | <0.15 (front side) <0.1 (back side) | homogeneous pigmentation no marble effect no shades |
| II (grey) | <0.1 (front side) <0.1 (back side) | almost homogeneous pigmentation little marble effect little to medium shades |
| A (white) | >1.5 (front side) >1.5 (back side) | almost homogeneous pigmentation little marble effect little to medium shades |
| B (grey) | >1.0 (front side) >3.0 (back side) | inhomogeneous pigmentation significant marble effect some defects (glass fibers) |

The plates on the basis of the color paste of the invention show a much better homogeneity and uniformity of color than those according to the sate of the art.

What is claimed is:

1. A process for preparing a pigmented curable molding compound comprising:
   a) preparing a color paste by:
      i) combining:
         I. a first thermoplastic polymer;
         II. a suitable solvent; and
         III. pigment particles;
      ii) grinding said pigment with (I) and (II) to form a color paste;
   b) mixing together:
      A. an unsaturated polyester resin, and
      B. a second thermoplastic polymer, in a weight ratio A:B of 0.4 to 10, the total of A and B being 100 parts by weight (pbw)
      C. 3–40 pbw of the color paste of (a),
      D. 0–450 pbw of a filler,
      E. 0.2–4 pbw of a radical initiator, as well as
      F. optionally further customary additives.

2. Process according to claim 1, wherein the first thermoplastic polymer is selected from vinylaromatic polymers, polyolefinic polymers, acrylic-based polymers, polyvinyl acetate polymers, saturated polyesters and combinations thereof.

3. The process of claim 1 wherein the color paste is obtained by dispersing 20–80 pbw pigment particles in 80–20 pbw of a solution of 10–60 wt-% of the first thermoplastic polymer in 90–40 wt.-% of the suitable solvent, the wt.-% being based on the total weight of said first thermoplastic polymer and the suitable solvent.

4. The process of claim 1 further comprising curing said curable molding compound to form homogeneously and uniformly colored mouldings, comprising 10 to 20 wt. % of cured polyester resin;

1 to 20 wt. % of a saturated polyester, replaced up to 50 wt. % of its weight by another thermoplastic polymer;

0.5 to 5 wt. % of pigment particles;

5 to 65 wt. % of fillers;

0.1 to 2 wt. % of a thickening agent;

10 to 65 wt. % of glass fibres;

and having a maximum color deviation $\Delta E_{max}$ from the average color value (determined according to DIN 6174) below 0.3.

5. The process of claim 1 wherein said first and second thermoplastic polymers are different.

* * * * *